United States Patent
Greenaway (10) Patent No.: US 8,020,616 B2
(45) Date of Patent: Sep. 20, 2011

(54) DETERMINING A STATUS IN A WELLBORE BASED ON ACOUSTIC EVENTS DETECTED BY AN OPTICAL FIBER MECHANISM

(75) Inventor: Robert Greenaway, Frimley (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 241 days.

(21) Appl. No.: 12/192,735

(22) Filed: Aug. 15, 2008

(65) Prior Publication Data

US 2010/0038079 A1   Feb. 18, 2010

(51) Int. Cl.
*E21B 47/00* (2006.01)
(52) U.S. Cl. ............ 166/254.2; 166/250.01; 166/250.15
(58) Field of Classification Search ................ 166/254.2, 166/250.01, 250.15
See application file for complete search history.

(56) References Cited

U.S. PATENT DOCUMENTS

| | | | |
|---|---|---|---|
| 5,194,847 | A | 3/1993 | Taylor et al. |
| 6,281,489 | B1 * | 8/2001 | Tubel et al. ............... 250/227.14 |
| 6,913,079 | B2 * | 7/2005 | Tubel ....................... 166/250.01 |
| 7,504,618 | B2 | 3/2009 | Hartog et al. |
| 2004/0141420 | A1 | 7/2004 | Hardage et al. |
| 2006/0272809 | A1 | 12/2006 | Tubel et al. |
| 2007/0012872 | A1 | 1/2007 | Poland et al. |
| 2007/0198223 | A1 * | 8/2007 | Ella et al. ..................... 702/188 |
| 2007/0252717 | A1 | 11/2007 | Fielder |
| 2008/0030714 | A1 | 2/2008 | Hall et al. |
| 2008/0142212 | A1 * | 6/2008 | Hartog et al. ............ 166/250.01 |
| 2009/0008536 | A1 | 1/2009 | Hartog et al. |
| 2009/0114386 | A1 * | 5/2009 | Hartog et al. ............ 166/250.08 |

FOREIGN PATENT DOCUMENTS

| | | |
|---|---|---|
| GB | 2126820 A | 3/1984 |
| GB | 2222247 A | 2/1990 |
| WO | 2007104915 A1 | 9/2007 |
| WO | 2007107815 A1 | 9/2007 |
| WO | 2008012497 A1 | 1/2008 |
| WO | 2008012500 A1 | 1/2008 |
| WO | 2008015390 A1 | 2/2008 |

OTHER PUBLICATIONS

Giallorenzi, T., et al., Optical fiber sensor technology. Quantum Electronics, IEEE Journal of, 1982. 18(4): p. 626-665.

Pechstedt, R.D. and D.A. Jackson, Design of a compliant-cylinder-type fiber-optic accelerometer: theory and experiment. Applied Optics, 1995. 34: p. 3009-3017.

Cranch, G.A. and P.J. Nash, High-responsivity fiber-optic flexural disk accelerometers. Journal of Lightwave Technology, 2000. 18(9): p. 1233-1243.

(Continued)

*Primary Examiner* — Giovanna C Wright
(74) *Attorney, Agent, or Firm* — Brandon S. Clark; Rodney V. Warfford; Trop, Pruner & Hu, P.C.

(57) ABSTRACT

A system for use in a well includes downhole equipment for positioning in the well, and an optical fiber for deployment in the well, the optical fiber to extend to a location of interest in the well in proximity of the downhole equipment. An analysis unit analyzes detected light signals returned from the optical fiber that has been affected by acoustic events generated by the downhole equipment and to determine a status in the wellbore based on the analyzing.

18 Claims, 5 Drawing Sheets

OTHER PUBLICATIONS

Cranch, G.A. and P.J. Nash, Large-Scale Multiplexing of Interferometric Fiber-Optic Sensors Using TDM and DWDM. Journal of Lightwave Technology, 2000. 19(5): p. 687-699.

Nash, P., Review of interferometric optical fibre hydrophone technology. IEE Pro.—Radar, Sonar Navig., Journal of, Jun. 1996. 143(3): p. 204-209.

* cited by examiner

DETERMINING A STATUS IN A WELLBORE BASED ON ACOUSTIC EVENTS DETECTED BY AN OPTICAL FIBER MECHANISM

TECHNICAL FIELD

The invention relates generally to determining a status in a wellbore based on acoustic events detected by an optical fiber mechanism.

BACKGROUND

Various types of equipment can be deployed in a wellbore to perform desired tasks, including well logging, fluid production, fluid injection, and other tasks. Examples of equipment include tubing, pipes, valves, motors, pumps, and so forth.

In the relatively harsh environments that are typically present in a wellbore, equipment positioned in the wellbore may wear out or fail over time. When equipment fails or exhibits reduced performance, an expensive intervention operation typically has to be performed, in which the failed equipment is extracted from the wellbore, and either repaired or replaced. Having to extract well equipment from a wellbore means that the wellbore may have to be shut in while the repair or replacement process proceeds. Shutting in a wellbore may cause fluid production or other operations to stop, which can result in reduced revenue. Also, having to perform an intervention operation means that service personnel have to be sent out to the well site, which can also be costly.

SUMMARY

In general, an optical fiber mechanism is provided to monitor equipment positioned in a wellbore. Using information provided by the optical fiber mechanism that is responsive to vibration or other acoustic events associated with the equipment, a status of the equipment can be detected.

Other or alternative features will become apparent from the following description, from the drawings, and from the claims.

BRIEF DESCRIPTION OF THE DRAWINGS

Certain illustrative embodiments of the invention will hereafter be described with reference to the accompanying drawings.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, an optical fiber mechanism is provided for monitoring downhole equipment positioned in a wellbore. The optical fiber mechanism is used for detecting vibration noise associated with the downhole equipment. For example, equipment with moving parts, such as motors, pumps, valves, and so forth, wear out over time. As such equipment wears out, vibration noise increases. As another example, during fluid production or injection, particles in the fluid may impact walls of conduits in the wellbore—such particle impacts may lead to vibration noise that is also detectable by the optical fiber mechanism, such as for the purpose of determining whether fluid flow has stopped which may indicate a problem in the well. Vibration of equipment, noise caused by particles impinging on equipment, or any other noise that may be induced downhole, is considered an "acoustic event."

In accordance with some embodiments, vibration signature analysis can be performed based on data collected by the optical fiber mechanism that is affected by acoustic events related to downhole equipment. The vibration signature analysis involves comparing a signature based on data collected from the optical fiber mechanism with a predefined signature, and providing a result based on the comparing. For example, wear may be detected based on the comparing that the detected vibration exceeds one or more predefined vibration limits.

In one embodiment, a coherent light source (e.g., a laser source) that produces coherent light can be used to generate optical pulses (also referred to as "probe" optical pulses) that are transmitted into an optical fiber. In response to one or more probe optical pulses transmitted into the optical fiber, backscattered light is returned to the location of the source. A detector can be positioned near the source to receive the backscattered light. Vibration noise that is present in a location downhole in the wellbore will cause a portion of the optical fiber to be subjected to acoustic waves, which can cause a localized change in the refractive index of the portion of the optical fiber. This change in the characteristic of the optical fiber portion will cause a change in the characteristic of the backscattered light received at the detector.

In an alternative embodiment, an optical fiber mechanism includes an optical fiber that is connected to at least one seismic sensor. The seismic sensor, which can be a hydrophone, accelerometer, or other device that is able to detect acoustic waves or particle motion, is operatively connected to the optical fiber. The seismic sensor is sensitive to acoustic waves that can be caused by vibration noise associated with the downhole equipment. The seismic sensor enhances the sensitivity of the optical fiber locally to an acoustic wave, which may be a pressure wave (a scalar quantity detectable with a hydrophone, for example) or particle motion (which can be detected with a sensor designed to measure acceleration).

One way of converting acoustic waves to an optical signal is through interferometric sensors, which convert a pressure wave or an acceleration into a path-like change (e.g., by straining the optical fiber) and thus modulating the phase of light traveling through the portion of the optical fiber that is affected by the seismic sensor. One exemplary implementation involves winding a section of an optical fiber on a compliant cylinder (which can be part of a hydrophone, for example), which varies the strain on the optical fiber in response to a pressure wave. An accelerometer-based design can include mass-loaded compliant materials (e.g., rubber) and flexural disks, which convert acceleration to strain on the optical fiber portion that is attached to the accelerometer.

Backscattered light received at the detector in either of the embodiments discussed above is analyzed by an analysis unit for determining what the equipment noise level is, and whether the equipment noise level is within acceptable limits. In one example implementation, analysis of the light information received by the detector can involve first converting the incoming time series of light signals to the frequency domain, and then using spectral analysis techniques to determine a departure from the expected acoustic signature. In other implementations, time domain pattern-matching, or wavelet transform comparisons, can be used to determine whether the detected light corresponds to a noise level that is outside acceptable limits.

Figure 1:
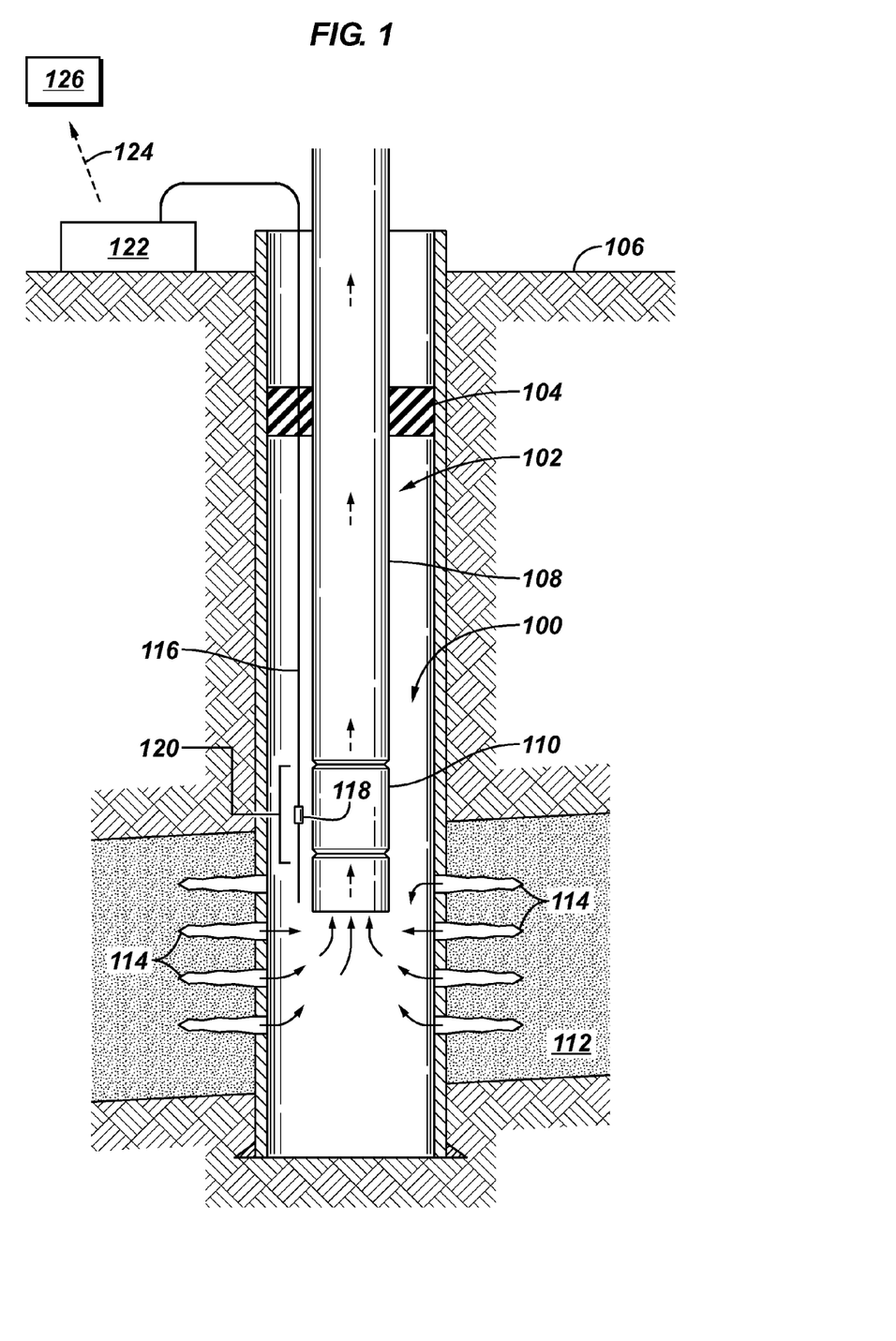
FIG. 1 illustrates an exemplary arrangement in which a fiber optic cable is deployed into a wellbore in which wellbore equipment is positioned, the fiber optic cable provided for monitoring the wellbore equipment in accordance with an embodiment.

FIG. 1 illustrates an exemplary arrangement in which downhole equipment is positioned in a wellbore 100. The downhole equipment includes a tubing string 102 that is held by a hangar 104 located near an earth surface 106 from which the wellbore 100 extends. The tubing string 102 includes a tubing 108 that has an inner bore through which fluids can flow (e.g., production fluids or injection fluids). An electric submersible pump (ESP) 110 (or other type of pump) that is also part of the tubing string 102 is attached to the tubing 108. The ESP 110 can assist in creating fluid flow to produce fluids from a reservoir 112 surrounding the wellbore 100 through the tubing 108 to the earth surface 106. Instead of the pump 110, other downhole components, such as valves, motors, etc., can be provided in the tubing string 102.

As depicted in FIG. 1, perforations 114 are formed into the reservoir 112 to enable fluids from the reservoir 112 to flow into the wellbore 100 for production through the tubing 108.

Also depicted in FIG. 1 is an optical fiber (in the form of a fiber optic cable) 116 that extends along a length of the tubing string 102. In the arrangement of FIG. 1, the fiber optic cable 116 runs along the outside of the tubing string 102. In the example depicted in FIG. 1, a seismic sensor 118 is depicted as being attached to the fiber optic cable 116. In a different embodiment, however, the seismic sensor 118 can be omitted.

Although the fiber optic cable 116 and sensor 118 are depicted as outside of tubing string 102, the location of the fiber optic cable 116 and sensor 118 should not be limited to this drawing. It should be noted that the fiber optic cable 116 and/or sensor 118 can be outside of the casing, inside of the tubing, or even in an offset well, among other locations.

The fiber optic cable 116 can be one of several different types of fiber optic cables: (1) a permanent fiber optic cable that is laid into the cable during manufacturing; (2) a fiber optic cable that is pumped into a control line that is provided in the wellbore 100; or (3) a bare optical fiber that is run from the earth surface to the area of interest downhole.

Operation of the ESP 110 is associated with a certain level of vibration. The ESP 110 has moving parts that can wear out over time. As such moving parts wear out, the ESP 110 may cause greater vibration thereby increasing vibration noise.

Vibration noise created by the ESP 110 can be detected as acoustic waves (pressure waves) or as particle motion. In the embodiment without the seismic sensor 118, the acoustic waves that impinge upon a local portion 120 of the fiber optic cable 116 in the proximity of the ESP 110 may cause a characteristic of the fiber optic cable portion 120 to change, which affects characteristics of backscattered light from the fiber optic cable portion 120. A portion of the fiber optic cable 116 in the proximity of the ESP 110 (or other downhole equipment being monitored) means that the portion of the fiber optic cable 116 is capable of detecting vibration noise associated with the downhole equipment being monitored.

In an exemplary embodiment that includes the seismic sensor 118, the seismic sensor 118 can cause a strain on the fiber optic cable portion 120 to change in response to the vibration noise. This interaction also effectively causes a change in the backscattered light from the fiber optic cable portion 120.

A fiber optic acquisition unit 122 may be positioned at the earth surface 106 close to the wellbore 100. The fiber optic cable 116 extends from the fiber optic acquisition unit 122 through the hangar 104 into the wellbore 100. The fiber optic acquisition unit 122 includes a light source for producing optical signals that are transmitted into the fiber optic cable 116. Backscattered light is received by a detector in the fiber optic acquisition unit 122.

In the illustrative embodiment of FIG. 1, the signals detected by the detector of the fiber optic acquisition unit 122 are transformed into data that can be transmitted (at 124) to a remote analysis unit 126. The analysis unit 126 may be used to analyze the data corresponding to the detected signals to determine whether any problem is present in the wellbore 100. Note that the data can be acquired by the fiber optic acquisition unit 122 in real time, and that the analysis unit 126 can analyze such data in real time in order to provide instantaneous (or nearly instantaneous) status updates of downhole conditions or conditions of a downhole component. Note that any background noise may be initially detected (such as by monitoring backscattered signals from the fiber optic cable 116 before any downhole operation is started). This background noise can then be removed from subsequent data considered by the analysis unit 126 for more accurate processing.

In a different implementation, instead of using a remote analysis unit 126, the analysis unit 126 can be part of the fiber optic acquisition unit 122.

Although not shown, it is noted that additional sensors can be provided, such as to measure single-point or distributed temperature measurements or pressure measurements, among other sensors.

Figure 2:
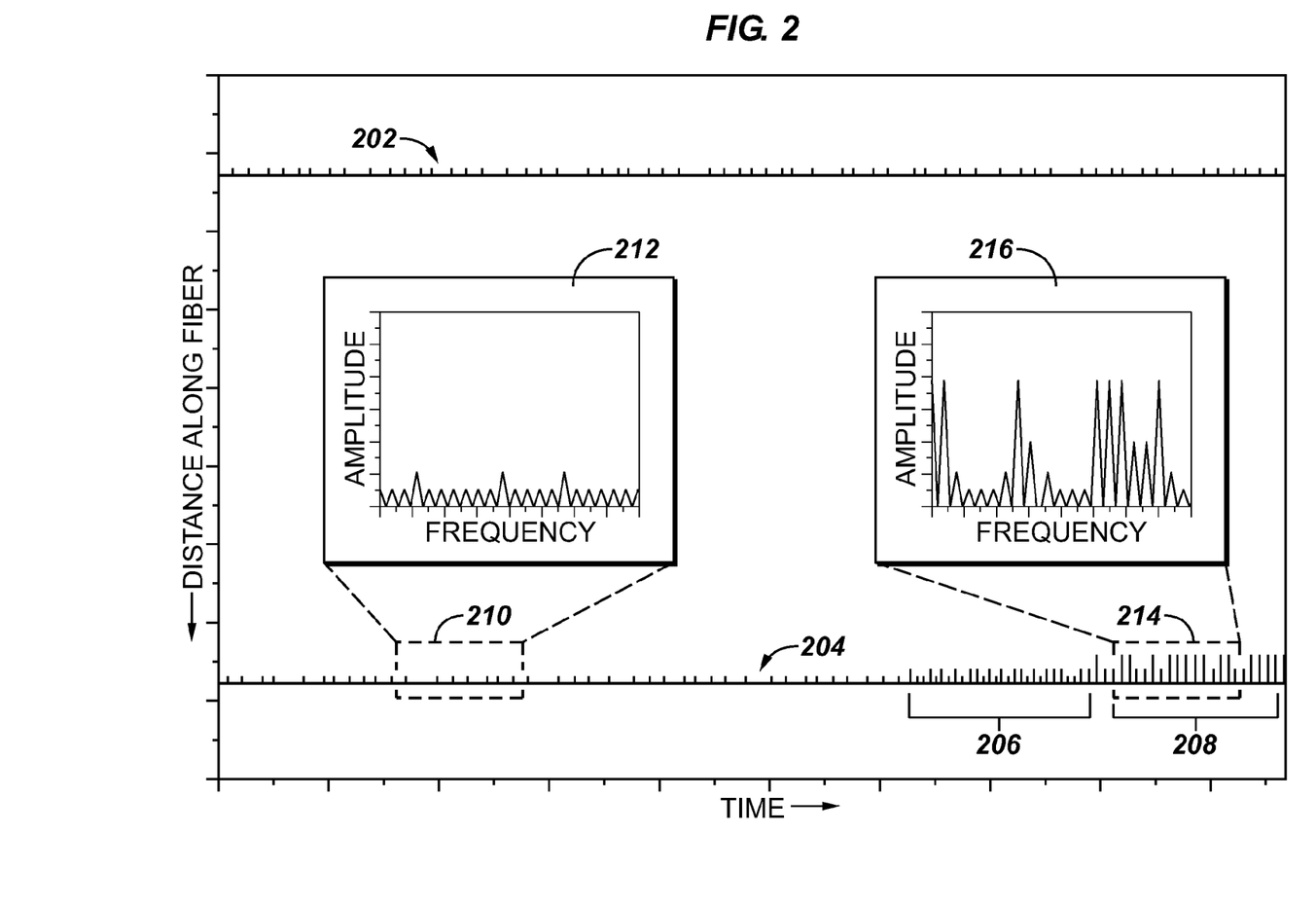
FIG. 2 is a chart that plots indicators over time to indicate whether or not a problem exists with wellbore equipment, in accordance with an embodiment.

FIG. 2 shows an exemplary output that can be displayed by the analysis unit 126, such as on a computer monitor, for example. FIG. 2 is a chart that plots indicators associated with different locations along the fiber optic cable (expressed as distance from the surface 106 along the fiber optic cable) over time. Line 202 (which is made up of a series of indicators) represents a first location along the fiber optic cable 116, while line 204 represents a second, different location along the fiber optic cable 116. The visual indicators provided along the line 202 indicate that a downhole component at the location corresponding to line 202 continues to vibrate normally over time.

However, the visual indicators along the line 204 indicate that over time, vibration has worsened. Worsening vibration can be indicated by a first group of indicators 206, which indicates that vibration has become worse but is still tolerable, and a second group of indicators 208, which indicates that vibration has reached a level that is outside acceptable limits. Note that indicators 206 are smaller ovals, while indicators 208 are larger ovals. Different colors can be assigned to the different indicators 206 and 208.

In the region (210) of line 204 that is associated with "normal" vibration, a user can retrieve an associated chart 212 (such as by clicking on the region 210 with a user input device such as a mouse device) that plots noise amplitude with respect to frequency. In the region (214) of the line 204 associated with a high vibration condition, the user can retrieve another chart 216 (such as by clicking in the region 214) that plots noise amplitude with frequency. Note that the noise amplitudes in chart 216 have larger spikes than amplitudes depicted in chart 212.

A spectral analysis can be performed by the analysis unit 126 on the waveforms depicted in charts 212 and 216 to determine whether problems exist in the downhole equipment at the location corresponding to line 204. Based on such spectral analysis, the user can be alerted that downhole equipment at the location corresponding to line 204 is experiencing problems, and may need attention.

Figure 3:
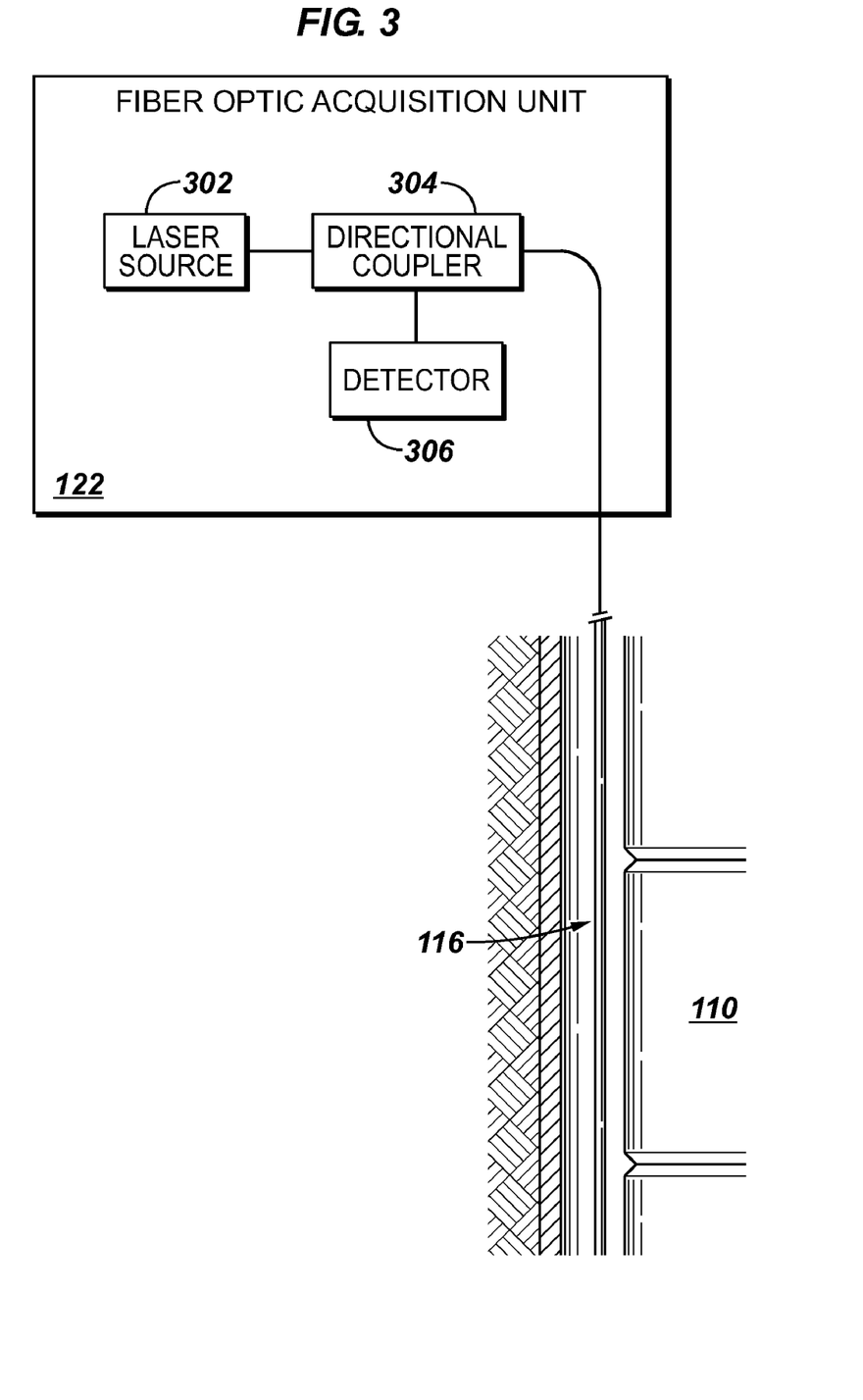
FIG. 3 is a schematic diagram of an optical fiber mechanism used to detect a problem with wellbore equipment, according to an embodiment.

FIG. 3 shows exemplary components of the fiber optic acquisition 122, which includes a coherent light source 302 (e.g., laser source). Light generated by the coherent light source 302 is transmitted through an optical directional coupler 304 into the fiber optic cable 116. Coherent Rayleigh backscattered light is returned from different points along the fiber optic cable 116. The returned backscattered light is provided through the directional coupler 304 to an optical detector 306.

The position in which a particular part of the backscattered light signal originates can be determined from the round trip transit time from the fiber optic acquisition unit 122 to a location of interest and back.

Rayleigh scattering arises from inhomogeneities in the glass of the optical fiber which results from density or composition fluctuations on a length scale much smaller than an optical wavelength and that are frozen into the glass at the time the fiber is drawn. With incoherent probe pulses the energy from all the scattered light is summed at the detector. However, if the source is coherent (i.e. there is a predictable phase relationship between all parts of the light pulse), then the phase of the light re-radiated from each of the scatterers (points along the optical fiber) has a fixed, but random, relationship. As a result, when the light from all these scatters is combined at the detector 306, the signal generated by the detector 306 is sensitive to the relative phases of the light from each scatterer. In other words, the generated signal is based on the summation of the electric fields of each scatterer, which is a phasor. When these are added, the summation may be modeled as the sum of a large number of complex numbers and the summation can result in a very large signal (if the phase relationships are such that the phasors add in amplitude—i.e., there is a constructive inference). However, if the phases are such that amplitudes sum to near zero, then the resulting detected signal can be very weak. The detected signals as a function of distance along the optical fiber thus takes the appearance of a jagged waveform, which however, is fixed if the optical fiber is undisturbed (e.g., no vibration noise) and if the probe optical frequency is constant.

If the optical fiber is disturbed at a particular position, such as due to impinging waves or due to increased strain applied by a seismic sensor on a portion of the optical fiber, then the phase relationship between the scatterers within one pulse width are perturbed and the backscatter signal is altered. This change in the backscatter signal can be detected and used to derive a measure of the acoustic perturbations suffered by the optical fiber at any particular location.

Figure 4:
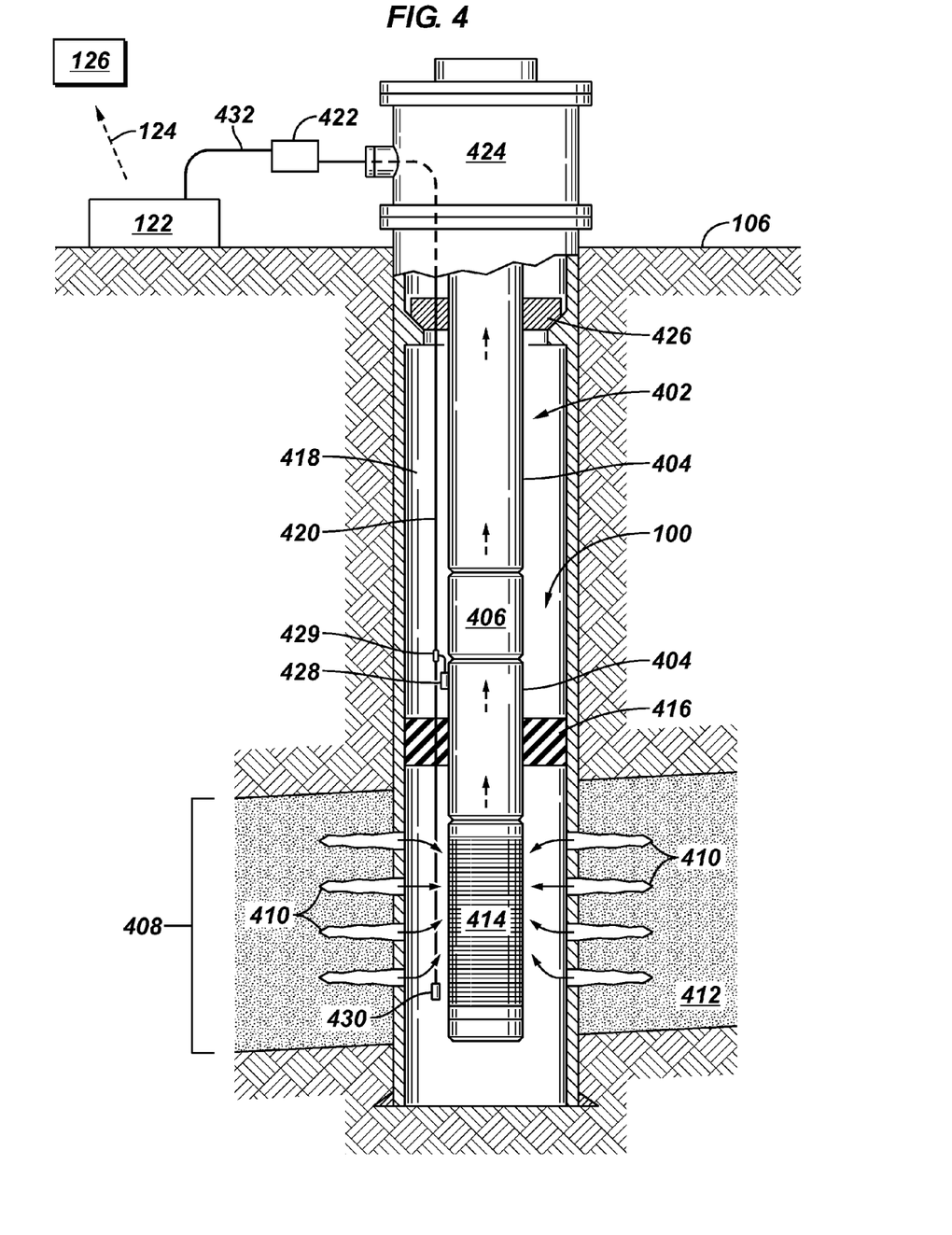
FIG. 4 illustrates another exemplary arrangement in which a fiber optic cable is deployed into a wellbore, in combination with a seismic sensor, for monitoring wellbore equipment, in accordance with another embodiment.

FIG. 4 shows another exemplary arrangement that includes downhole equipment positioned in a wellbore 100. The arrangement of FIG. 4 also includes a fiber optic acquisition unit 122 positioned at the earth surface 106, which is able to send data (at 124) to a remote analysis unit 126.

In FIG. 4, however, the downhole equipment positioned in the wellbore 100 is different from the downhole equipment of the FIG. 1. In FIG. 4, the downhole equipment includes a tubing string 402 that has a tubing 404 and an ESP 406. The tubing 404 extends below the ESP 406 to a production interval 408, which includes perforations 410 that extend into a reservoir 412. The tubing 404 that is proximate the production interval 408 includes a perforated tubing section 414 that has perforations to enable fluids to flow into the inner bore of the tubing 404.

Also depicted in FIG. 4 is a packer 416 that is set to isolate the production interval 408 from an annulus 418 above the packer 416.

A fiber optic cable 420 extends from a junction box 422 at the earth surface 106, through wellhead equipment 424, through a hanger 426 (on which the tubing string 402 is supported), and along the length of the tubing string 402. The fiber optic cable 420 also extends through the packer 416 to the production interval 408. The junction box 422 is connected by a surface cable 432 to a fiber optic acquisition unit 122.

Two seismic sensors can be provided in the arrangement of FIG. 4, with a first seismic sensor 428 positioned near the ESP 406, and a second seismic sensor 430 positioned in the production interval 408. Both seismic sensors 428 and 430 may be attached to the fiber optic cable 420. In response to detected acoustic waves or particle motions, the seismic sensors 428 and 430 are able to locally adjust the strain of the corresponding portions of the fiber optic cable 420. A splice 429 is provided in the fiber optic cable 420 at the seismic sensor 428 to enable the fiber optic cable 420 to be connected to the seismic sensor 428 as well as to extend further downwardly in the wellbore 100.

In alternative implementations, one or both of the seismic sensors 428 and 430 can be omitted in other implementations.

In the production interval 408, vibration noise can be caused by sand particles or other particles hitting the tubing 404 as a result of fluid flow. The acoustic waves caused by the sand particles hitting the tubing wall can be used to help identify which zone (e.g., the production interval 408) is producing sand or other particles, and if the volume of the sand or other particles is such that damage will occur unless some remedial action is taken. In an implementation in which the seismic sensor 430 is present, the acoustic waves detected by the seismic sensor 430 will be converted into an applied local strain on the corresponding portion of the fiber optic cable 420. The strain applied locally to the fiber optic cable portion will cause a change in the backscattering of light.

Likewise, other changes in the acoustic signature of the production interval 408 can occur if the perforations become obstructed, or if the well becomes distorted through geological movement (e.g., formation compaction), or the dimensions of the well change significantly through corrosion or deposition of solids, such as scale, among others.

In this illustrative example, the seismic sensor 428 may be used to detect vibration noise change in the ESP 406, similar to that performed in the arrangement of FIG. 1.

In other embodiments, the system depicted in FIG. 1 or FIG. 4 can be linked to a central control system that can provide alarms to users in response to various conditions associated with the wellbore. For example, the analysis unit 126 can provide the information to the central control system, which in turn can provide alerts or alarms to users. This may allow the system to automatically update monitoring condition limits to be more appropriate to operating conditions, for example. The monitoring condition limits refers to the limits associated with vibrations of downhole components or other acoustic events associated with the downhole components that are compared to by the analysis unit 126 to determine if a problem exists in the wellbore. Effectively, the central control system may provide feedback to the analysis unit 126 to enable the analysis unit 126 to modify the limits.

Also, the central control system can perform automatic control of equipment, whether downhole or at the earth surface, in response to information provided by the analysis unit 126. For example, the central control system can activate or deactivate the equipment, perform incremental adjustment of the equipment, or provide user notification to enable the user to manually adjust the equipment.

Figure 5:
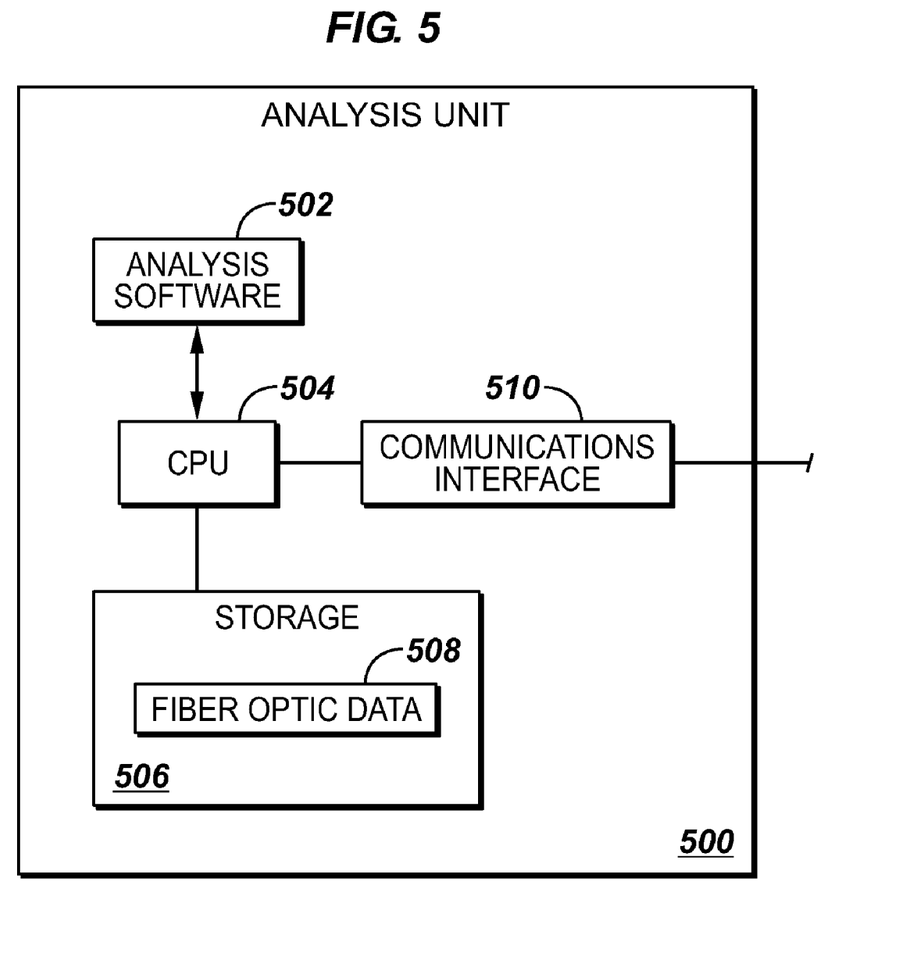
FIG. 5 is a block diagram of an exemplary system that is capable of processing data received from the fiber optic cable of FIG. 1 or 4 to determine if a problem is present with wellbore equipment, according to an embodiment.

FIG. 5 shows an exemplary analysis unit 500, which can be implemented with a computer, for example. The analysis unit 500 includes analysis software 502 that is executable on one or more central processing units (CPUs) 504. The CPU(s) 504 is (are) connected to storage 506. The storage 506 can contain backscattered optical data 508 received from the fiber optic acquisition unit 122 (FIG. 1 or 4).

The CPU(s) 504 is (are) connected to a communications interface 510, which in turn is connected to a communications link that is coupled to the fiber optic acquisition unit 122.

Instructions of the analysis software 502 are loaded for execution on a processor such as the one or more CPUs 504. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A system for use in a well, comprising:
   downhole equipment for positioning in the well;
   an optical fiber for deployment in the well, the optical fiber to extend at least to a location of interest in the well in a proximity of the downhole equipment, and
   an analysis unit to analyze detected light signals returned from the optical fiber that has been affected by acoustic events generated by the downhole equipment and to determine a status in the wellbore based on the analyzing, wherein the analysis unit analyzes detected light signals from multiple points along the optical fiber's length so as to determine a distributed profile representative of at least one condition along the optical fiber's length; and
   a seismic sensor operatively connected to a portion of the optical fiber, wherein the seismic sensor is to modify a characteristic of the optical fiber portion in response to detecting the acoustic events.

2. The system of claim 1, wherein the acoustic events generated by the downhole equipment is due to vibration of the downhole equipment.

3. The system of claim 1, wherein the acoustic events generated by the downhole equipment is due to particles in the wellbore impinging on the downhole equipment.

4. The system of claim 1, wherein the analyzing involves comparing an acoustic signature corresponding to the detected light signals to at least one predefined limit to determine if a problem exists in the wellbore.

5. The system of claim 4, wherein the analysis unit is to receive feedback regarding operating conditions in the wellbore, and to adjust the at least one predefined limit in response to the feedback.

6. The system of claim 1, wherein the analysis unit is to analyze the light signals returned from the optical fiber in real time.

7. The system of claim 1, wherein the detected light signals are detected Rayleigh backscattered light signals.

8. The system of claim 1, wherein the characteristic of the optical fiber portion modified comprises a strain of the optical fiber portion.

9. The system of claim 1, wherein the downhole component includes moving parts that cause vibration during operation.

10. The system of claim 1, wherein the optical fiber extends to at least two zones of interest to enable monitoring of conditions in the at least two zones based on detected acoustic events, wherein the downhole equipment is located in one of the at least two zones.

11. The system of claim 1, further comprising an acquisition unit that includes a light source and a light detector, the light source to transmit light pulses into the optical fiber, and the light detector to detect the light signals returned from the optical fiber.

12. A method of monitoring a condition in a wellbore, comprising:
   receiving backscattered light signals from an optical fiber deployed into the wellbore, wherein the optical fiber has a portion for monitoring downhole equipment in the wellbore, and wherein the optical fiber portion has a characteristic that is modified in response to an acoustic event associated with the downhole equipment;
   analyzing a signature derived from the received backscattered light signals, wherein the signature is representative of the acoustic event; and
   providing information relating to a status in the wellbore based on the analyzing, wherein receiving the backscattered light signals comprises receiving the backscattered light signals that have been affected by strain imposed on the portion of the optical fiber by a seismic sensor.

13. The method of claim 12, further comprising:
   automatically adjusting additional equipment in response to an output based on the analyzing.

14. The method of claim 12, further comprising:
   determining background noise in the wellbore,
   wherein analyzing the signature removes the background noise.

15. The method of claim 12, wherein receiving the backscattered light signals comprises receiving the backscattered light signals that have been affected by vibration of the downhole equipment.

16. The method of claim 12, wherein receiving the backscattered light signals comprises receiving the backscattered light signals that have been affected by acoustic waves generated by particles impinging upon the downhole equipment.

17. The method of claim 12, wherein receiving the backscattered light signals comprises receiving the backscattered light signals that have been affected by strain imposed on the portion of the optical fiber by a seismic sensor.

18. The method of claim 12, wherein the seismic sensor comprises one of a hydrophone and accelerometer.

* * * * *